Feb. 9, 1926.

A. A. MATHESON

BEET TOPPER

Filed Jan. 28, 1924

Inventor
Andrew A. Matheson.
By A. J. O'Brien
Attorney

Feb. 9, 1926.

A. A. MATHESON 1,572,499

BEET TOPPER

Filed Jan. 28, 1924

Inventor
Andrew A. Matheson
By A. J. O'Brien
Attorney

Feb. 9, 1926.

A. A. MATHESON 1,572,499

BEET TOPPER

Filed Jan. 28, 1924      5 Sheets-Sheet 3

Inventor
Andrew A. Matheson.
By A.J.O'Brien
Attorney

Feb. 9, 1926. 1,572,499
A. A. MATHESON
BEET TOPPER
Filed Jan. 28, 1924   5 Sheets-Sheet 4

Inventor
Andrew A. Matheson.
By A. J. O'Brien
Attorney

Feb. 9, 1926.
A. A. MATHESON
BEET TOPPER
Filed Jan. 28, 1924
1,572,499
5 Sheets-Sheet 5
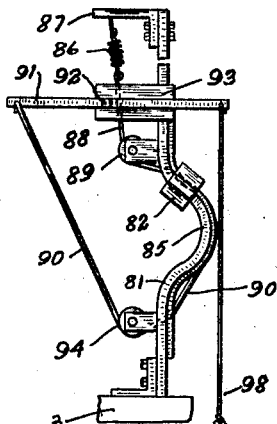
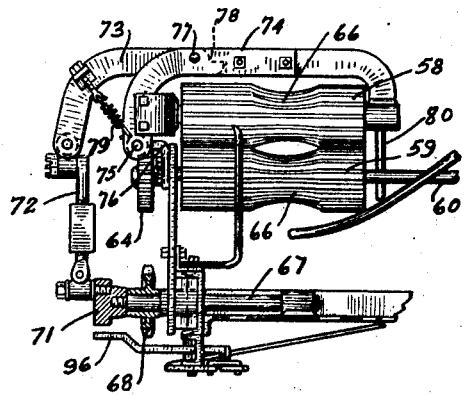
Fig. 7.
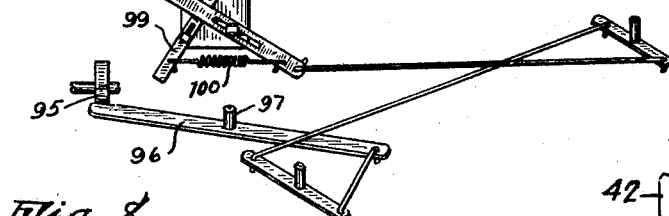
Fig. 8.
Fig. 14.
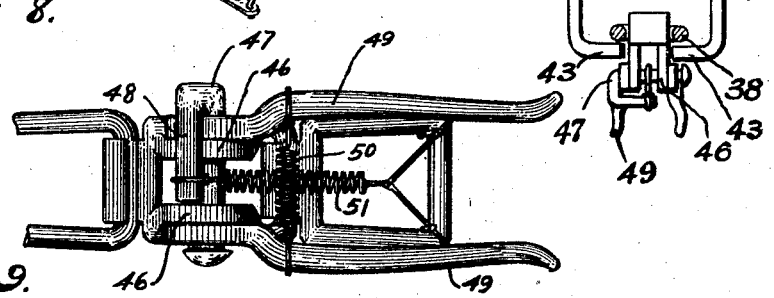
Fig. 9.
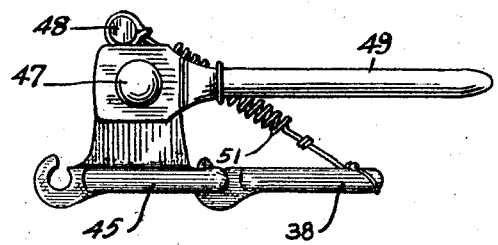
Fig. 10
Inventor
Andrew A. Matheson.
By *A. J. O'Brien*
Attorney Patented Feb. 9, 1926.

1,572,499

UNITED STATES PATENT OFFICE.

ANDREW A. MATHESON, OF SHOSHONI, WYOMING, ASSIGNOR TO ANDREW A. MATHESON, OF DENVER, COLORADO, A. C. ALLEN, OF RIVERTON, WYOMING, AND EDWARD MERIAM, OF MONETO, WYOMING, TRUSTEES OF THE MATHESON BEET HARVESTER SYNDICATE, A COMMON-LAW TRUST.

BEET TOPPER.

Application filed January 28, 1924. Serial No. 688,971.

*To all whom it may concern:*

Be it known that I, ANDREW A. MATHESON, a citizen of the United States, residing at Shoshoni, county of Fremont, and State of Wyoming, have invented certain new and useful Improvements in Beet Toppers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in beet harvesters.

In certain parts of our own country and in many foreign countries, sugar beets are extensively cultivated for the production of sugar.

The cultivating and harvesting of beets requires a large amount of labor, which increases the cost of production. When the beets are ready to be harvested, they are usually loosened by specially constructed plows, after which they are topped by manual labor and loaded onto wagons. The digging, topping and loading of the beets involves a great deal of labor that, in my opinion, can as well be performed by machinery at a much lower cost per ton of beets.

It is the object of this invention to produce a simple and practical machine that can be built at a moderate cost, and which will pull the beets and convey them to a topping mechanism where the tops are removed, after which they may be loaded on wagons and hauled to the dump at the factory, or loaded onto cars.

In order to properly describe my machine and the manner in which it operates, I shall have reference to the accompanying drawings in which the present preferred embodiment is shown, and in which:

Fig. 5 is a section taken on line 5—5, Fig. 1;

Fig. 6 is an elevation of the topping knife and its guide;

Fig. 7 is a view taken along line 7—7, Fig. 1; and shows a rear elevation of the rollers;

Fig. 8 is a diagrammatic representation of the mechanism employed for operating the topping knife;

Fig. 9 is a plan view of a section of the conveyor chain showing one of the beet-gripping clamps;

Fig. 10 is a side elevation of the mechanism shown in Fig. 9;

Fig. 14 is a section taken on line 14—14, Fig. 2.

The same reference characters will be used to indicate the same parts throughout the several views.

Figure 1:
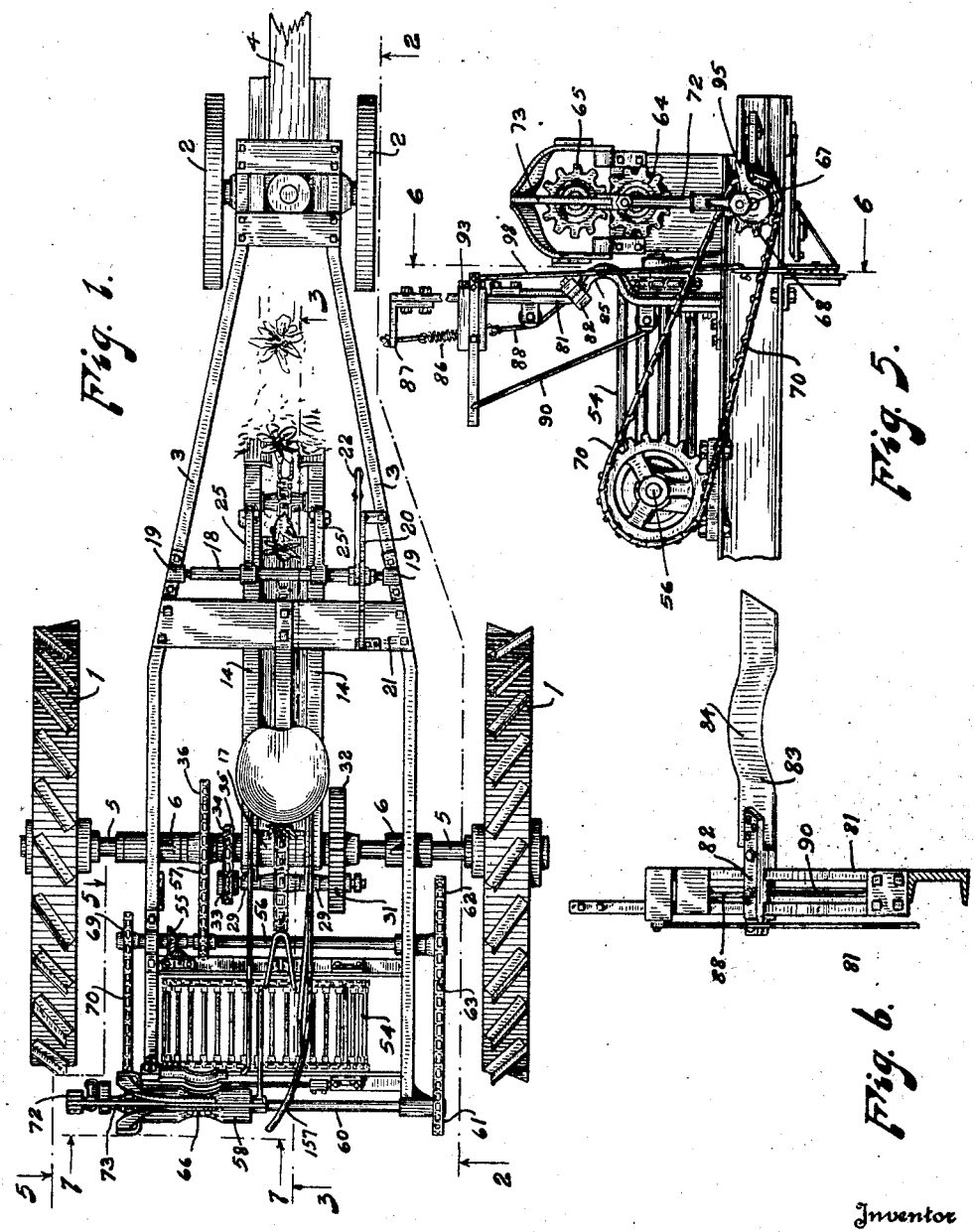
Fig. 1 is a top plan view of my machine.
Figure 2:
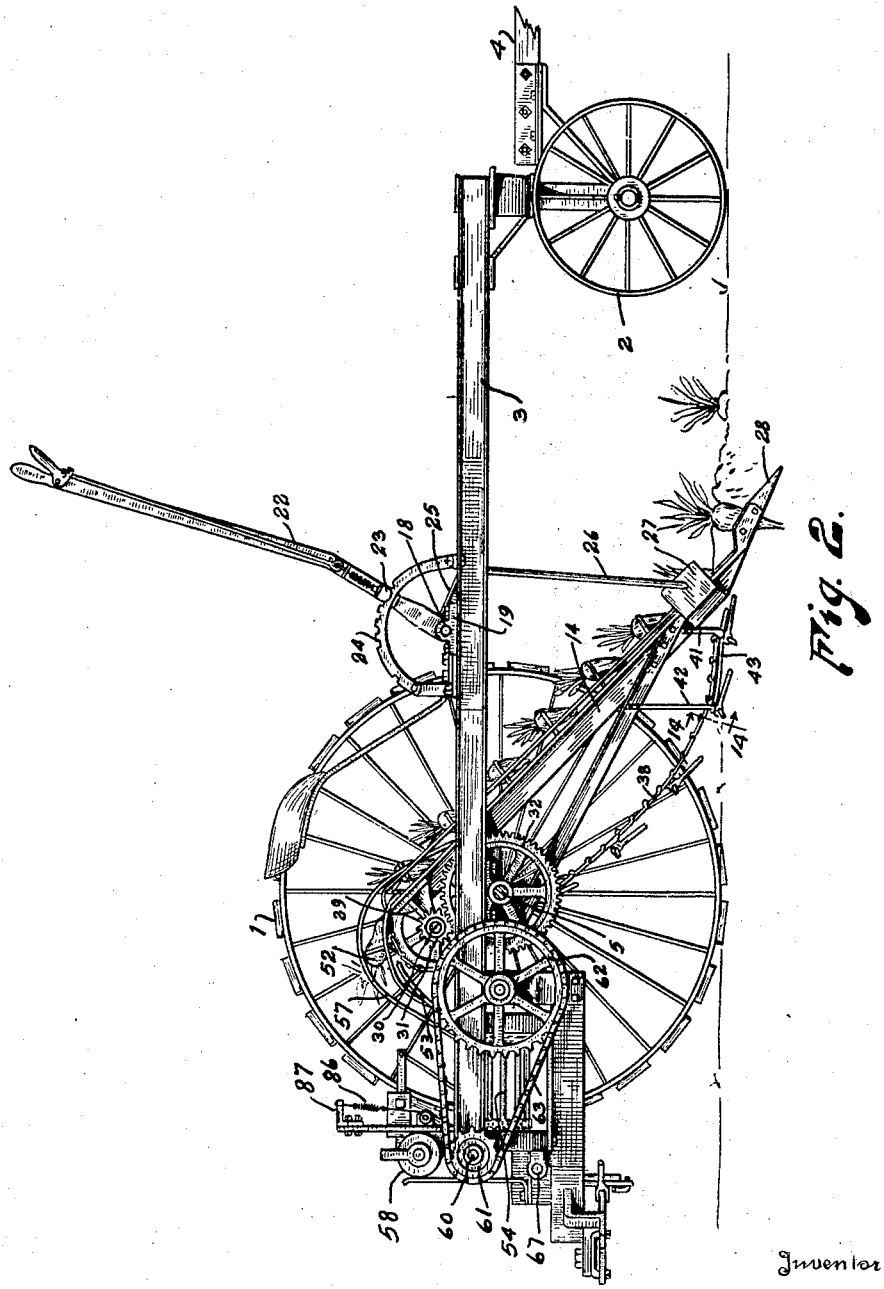
Fig. 2 is a section taken on line 2—2, Fig. 1.
Figure 3:
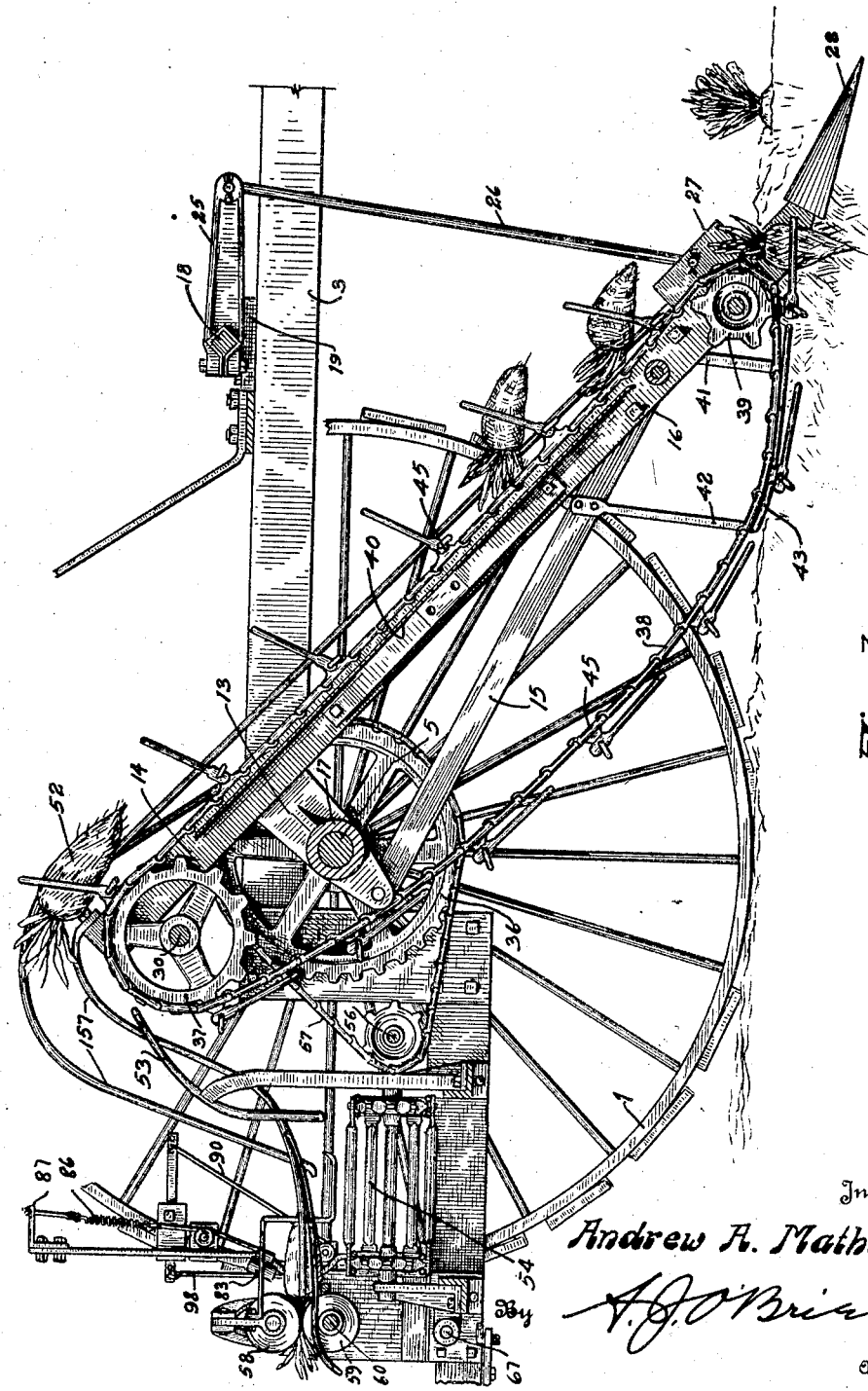
Fig. 3 is a section taken on line 3—3, Fig. 1, and shows the parts somewhat enlarged.
Figure 4:
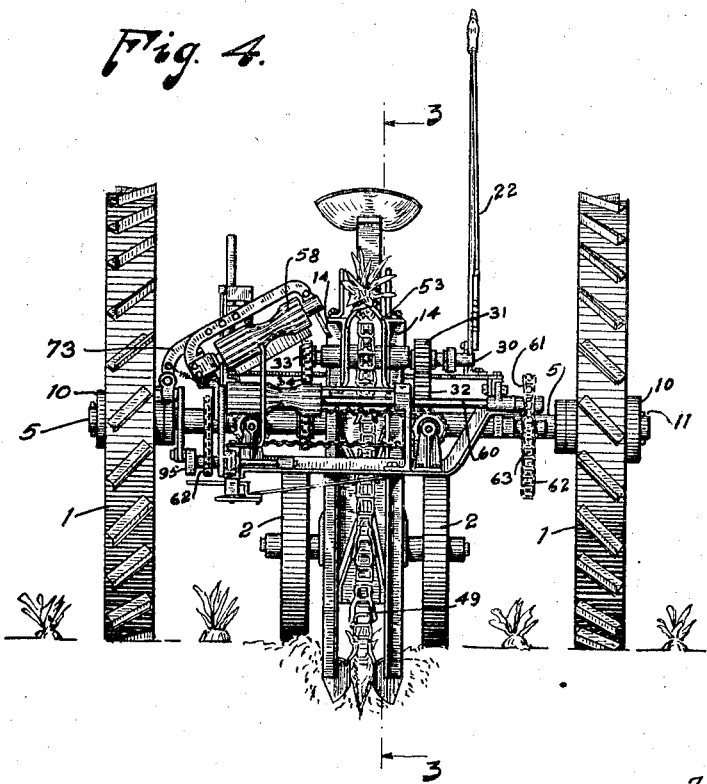
Fig. 4 is a rear elevation of the machine.
Figure 13:
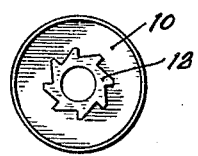
Fig. 13 is a section taken on line 13—13, Fig. 11.
Figure 12:
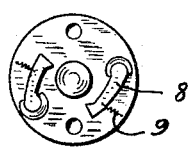
Fig. 12 is a section taken on line 12—12, Fig. 11.
Figure 11:
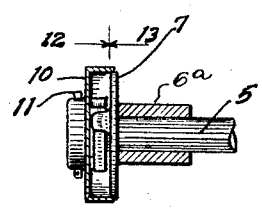
Fig. 11 is a section taken through the wheel hub.

My harvester is provided with two rear wheels 1 and two forward wheels 2, which support a chassis framework 3. The front wheels are pivotally connected to the chassis and are controlled by a tongue 4, to which the horses are attached in the usual manner. The rear wheels are spaced apart the width of three rows of beets, while the front wheels are spaced the width of one row only (Figs. 1 and 4). An axle 5 is journaled in the bearings 6 that are secured to the chassis frame. The rear or drive wheels 1 are mounted on the ends of the axle 5 and operatively connected thereto by means of a pawl and ratchet mechanism, such as that shown in Figs. 11, 12 and 13, in which 6ª indicates the hub of the wheel to which a flange 7 is secured. This flange is provided with one or more pawls 8 that are forced inwardly by means of springs 9. To the outer ends of the shaft I secure a cap 10 by means of pins 11. When the wheels are rotated in a forward direction, the pawls 8 will engage the ratchet teeth 12 and rotate the shaft, but when the wheels rotate in the opposite direction, the pawls and ratchet means will have no tendency to rotate the shaft. This arangement also serves as a differential mechanism, which permits turning. Either one or both of the wheels 1 may be connected to the shaft by ratchet means, as the operation is not affected in the least thereby. Two brackets 13 are rotatably mounted on the shaft 5. To the upper end of each bracket 13 I secure an angle iron 14. To the lower end of each bracket 13 a brace 15 has one end secured (Fig. 3), the other end being secured at 16 to the angle iron 14, forming triangles. The two brackets are integral with a central bearing member 17. Secured to the top of the chassis frame 3 is a shaft 18 that is pivotally mounted in bearings 19. A quadrant 20 is secured at one end to one of the frame members 3 and at the other to the transverse plate 21 (Figs. 1 and 2). A handle 22 is secured to one end of shaft 18 and is provided with a reciprocable plunger 23 that cooperates with the notches 24 of the quadrant for the purpose of holding the lever in adjusted position. Secured to shaft 18 are two arms 25 whose ends are connected by rods 26 to plates 27, which are secured to the front end of the angle irons 14, which are also provided with plow points 28 of the type usually employed in connection with beet diggers. Secured to the upper and rear ends of the angle irons 14 are brackets 29, which serve as bearings for shaft 30. To one end of shaft 30 I secure a pinion 31 that meshes with the gear 32 that is secured to shaft 5. Pinion 31 is slidably but non-rotatably connected to shaft 30 so that it may be moved into or out of engagement with the gear 32. To the other end of shaft 30 I secure a sprocket wheel 33 that is operatively connected by means of a chain 34 to a sprocket wheel 35 that is rotatably mounted on shaft 5 and interlocked with another sprocket wheel 36 that is also rotatable on shaft 5, and which serves to transmit power to the topping mechanism, which will be hereinafter described. Secured to shaft 30 and located between the brackets 29 is a sprocket wheel 37 that serves to drive an endless conveyor chain 38 which also passes around the sprocket wheel 39 that is located between the angles 14 near their front or lower ends. When the harvester is pulled in a forward direction, the conveyor chain 38 moves with its lower side going downward and its upper side in an upward direction. A plate 40 joins the two adjacent sides of angles 14 and provides a support for chain 38 in the manner clearly apparent from Fig. 3. Secured to the angles 14 and the brace bars 15 are vertical bars 41 and 42 whose lower ends are connected by a guide rod 43 on which the chain 38 rests just before it enters onto the sprocket 39. Spaced equidistantly along chain 38 are special links 45 which are provided intermediate their ends with parallel upstanding ears 46, which are perforated for the reception of the bolt 47 that is rotatably mounted in the ears 46, and is bent into the form of a U, one leg 48 being shorter than the bolt portion. Mounted on the bolt 47 and non-rotatable thereon, are fingers 49. The holes in the fingers 49, in addition to being non-circular, are also larger than the bolt, so that the fingers may move away from each other into the position indicated by dotted lines in Fig. 9, whenever this is necessary for the purpose of grasping a beet. A spring 50 connects the two fingers 49 and tends to move them to the full line position in Fig. 9. A second spring 51 extends from the part 47 to one of the adjacent links 38 and tends to hold the fingers in the position shown in Fig. 10, but permits them to rotate into the position shown in Fig. 3.

The function of the fingers 49 is to grasp the beets, after they have been loosened by the plow points 28, and to convey them to the topper. The manner in which the beets are grasped and carried is shown quite clearly in Fig. 3. When the beets reach the point designated by numeral 52 (Fig. 3) or a little beyond this point, they engage the bent rod 53 and are removed from the grasp of the fingers 49 and drop down upon the conveyor belt 54, which is driven by means of the bevel gears 55, one of which is secured to shaft 56, which derives its power from sprocket wheel 36 through the medium of the chain 57. When the harvester is pulled in a forward direction, the conveyor belt 54 carries the beets towards the left. For the purpose of guiding the beets in their passage from point 52, where they are released from the fingers 49, to the conveyor belt 54, I have provided various guide bars which I shall designate as a guiding means, and which are indicated by the numeral 157 After the beets have been pulled and deposited on the conveyor 54, the next operation is that of topping. The mechanical topping of beets is a very difficult operation to successfully accomplish, as the beets are of various sizes and have crowns that are different. My topping mechanism comprises two rollers 58 and 59 located vertically, one above the other. Roller 59 is the lower of the two and has a central shaft or axle 60 that has secured to one end thereof a sprocket wheel 61 that is operatively connected with another sprocket wheel 62 by means of a sprocket chain 63, which is secured to one end of the shaft 56. To the other end of shaft 60 I secure a gear wheel 64 that meshes with a similar gear 65 connected to the axle of the upper roller 58. The function of the gears 64 and 65 is to cause the rollers to turn at the same speed, but in opposite directions. The direction of rotation of the rollers is such that the adjacent surfaces move rearwardly. The rollers are identical and have each a central portion 66 of reduced diameter. It is evident that if the tops of the beets could be inserted between the rollers the crown of the beet would be pulled firmly against the rollers, which, however, will not permit the beet to pass. It is obvious, from an inspection of Fig. 7, that when the rollers are in closed position, the beet tops cannot enter from the end and I have therefore provided means for moving the rollers into the open position shown in Fig. 4 at intervals which correspond to that required for the fingers 49 to deposit a beet on the conveyor belt 54. Referring now more particularly to Fig. 7, it will be seen that there is a short shaft 67 rotatably mounted directly below shaft 60. Near the outer end of this shaft I mount a sprocket wheel 68, which is connected to the sprocket wheel 69 by means of a chain 70. Secured to the outer end of shaft 67 is a crank disk 71 having a crank pin to which the lower end of the connecting rod 72 is connected. The upper end of connecting rod 72 is pivotally connected to bar 73, which is riveted between the two members 74 that support the bearings for the upper roller 58. The two members 74 are pivoted at 75 to a bracket 76 (Fig. 7). Bar 73 is pivoted to bars 74 at point 77 and has a projecting portion 78 that engages a cooperating stop on members 74. A spring 79 connects the bar 73 with the pivot pin 75. This construction permits the upper roller to yield and to swing about the pivot 75 even when the connecting rod 72 is in the position shown in Fig. 7, and permits the rollers to be positively opened when the crank disk 71 is rotated 180 degrees from the position shown in Fig. 7. A pin 80 projects downwardly past the lower roller in the manner shown in Figs. 4 and 7. This pin prevents beet tops from getting in between the rollers until they assume the open position shown in Fig. 4. The various drive wheels are so proportioned that the rollers open at the same rate that the grasping fingers 49 deliver beets to the conveyor belt 54. When a beet has been introduced between the rollers, the latter will close and pull the crown up tight against the rollers, after which the crown is severed from the beet by means which will now be described.

Referring now more particularly to Figs. 3, 5, 6 and 8, it will be noticed that I have secured to the frame member 3 a vertical guide 81. This guide is formed from two parallel members spaced apart a short distance in the manner shown in Fig. 6. A cross-head 82 is slidably mounted on the vertical guides 81 and has attached thereto a knife 83 whose central portion is curved, as indicated at 84. The guides 81 have a curved portion 85 whose central part is on the same level as the upper portion of the lower roller. The cross-head and the knife are normally held in the position shown in Fig. 8 by means of a tension spring 86, one end of which is supported from bracket 87. The other end of the spring is connected to the cross-head 82 by means of a cable 88, which passes over the pulley 89. A second cable 90 has one end connected to the cross-head 82 and the other connected to the end of a lever 91, which is pivoted at 92 to a bracket 93. The cable 90 passes about a pulley 94. If lever 91 is rotated clockwise about the pivot 92, it will force the cross-head 82 to move downwardly along the guides 85 in a manner that will be apparent from Fig. 8. Means are provided for moving the knife downwardly immediately before the rollers start opening. In Fig. 8 I have indicated in a diagrammatic manner the mechanism employed for operating the knife. Secured to the end of shaft 67 is a cam 95 which projects from the side of the crank disk 71 in the manner shown in Fig. 5. Located underneath the cam 95 and with one end projecting into the path of the cam is a lever 96 that is pivoted at 97. The other end of lever 96 is connected by means of a system of levers and links to a tension member 98 that is connected to the free end of the lever 91 in the manner shown in Fig. 8. The bar 99 is merely an adjustable anchor for the spring 100, which serves to hold the lever 96 normally in a position where it will be engaged by the cam. I have not described in detail all the levers and links shown in Fig. 8, as they are made necessary only by the fact that the construction of the machine requires them for the purpose of avoiding obstructions and of multiplying movements, the object to be obtained being to have the cam 95 move the knife 83 downwardly past the roller for the purpose of cutting the crowns from the beets. After the crown of the beet has been removed, the beet will be carried along by the conveyor belt 54 and either dropped on the ground or into a loading elevator that has not been shown.

I want to call particular attention to the topping mechanism, as it is in this that my invention primarily resides, although the construction of the conveyor is believed to cooperate with the topper so as to form a legitimate combination, for this reason, that in order to have my topper operate successfully, it is necessary that the beets shall be delivered thereto with the crowns pointing rearwardly. It is evident that any construction of conveyor cannot be used, as they do not all deliver the beets in the same relative position to the topper. The conveyor chain 38 is provided with a sufficient number of grasping fingers and is run at such a speed that every beet will be grasped in the manner shown. The rollers 58 and 59 open in synchronism with the delivery of beets onto the conveyor belt, assuming one beet is carried by each set of grasping fingers. As the rollers open into the position shown in Fig. 4, the top of one beet will be moved in between the rollers, after which the rollers will close and pull the beet crown against the rollers. At this point the knife 83 will be moved downwardly and will cut the crowns off from the beets. The tops will then be moved rearwardly by the action of the rollers and will drop on the ground, while the beets will be carried to one side by the conveyor belt.

Having now described my invention, what I claim as new is:

1. A topping device for beet harvesters, comprising, in combination, a pair of rollers mounted to rotate about substantially parallel, horizontal axes, means for introducing beet tops between said rollers, said means comprising a conveyor belt, a knife, and means for moving said knife up and down in front of said rollers at predetermined intervals.

2. A topping device for beet harvesters, comprising, in combination, a pair of rollers, one located substantially vertically over the other and rotatable about axes that are normally parallel, mounting means for the upper roller which is hinged at one end and adapted to swing in a plane passing through the axis of the other roller, means for periodically swinging said roller in said plane, a conveyor belt movable in a horizontal plane parallel with the axis of the lower roller, a cutting device, and means for reciprocating the same in front of said rollers at a time when their axes are parallel.

3. A topping device for beet harvesters, comprising, in combination, a pair of rollers, one located substantially vertically over the other and rotatable about axes that are normally parallel, said rollers having cylindrical ends and a central portion of reduced diameter, mounting means for the upper roller which is hinged at one end and adapted to swing in a plane passing through the axis of the other roller, means for periodically swinging said roller in said plane, a conveyor belt movable in a horizontal plane parallel with the axis of the lower roller, a cutting device, and means for reciprocating the same in front of said rollers at a time when their axes are parallel.

4. A topping device for beet harvesters, comprising a conveyor belt, a pair of rollers mounted for rotation about axes substantially parallel with the plane of the upper side of the conveyor belt, said rollers being mounted with their axes substantially vertically arrayed, means permitting the upper roller to swing about a pivot transverse to the common plane of the roller axes, resilient means for normally holding the upper roller in a position in which its axis is parallel with the axis of the lower roller, means for intermittently moving the upper roller about the transverse pivot, a knife, guide means for determining the path of movement of said knife, and means operatively related to the means that intermittently swings the upper roller for moving the knife back and forth in front of the rollers during that period in which the roller axes are parallel.

5. A device in accordance with claim 4 in which the rollers have a constricted central portion.

6. A device in accordance with claim 4 in which the rollers are fluted and have a constricted central portion.

7. A device in accordance with claim 4 in which the rollers have a constricted central portion and in which the knife is curved to conform to the curvature of the rollers.

In testimony whereof I affix my signature.

ANDREW A. MATHESON.